No. 870,142. PATENTED NOV. 5, 1907.
V. J. WAHLSTROM.
CHUCK.
APPLICATION FILED OCT. 25, 1906.

Attest
F. H. Vick
H. E. Karlson

Inventor
Verner J. Wahlstrom
By Sydney Prescott, Atty.

UNITED STATES PATENT OFFICE.

VERNER J. WAHLSTROM, OF NEW YORK, N. Y.

CHUCK.

No. 870,142.

Specification of Letters Patent.

Patented Nov. 5, 1907.

Application filed October 25, 1906. Serial No. 340,522.

*To all whom it may concern:*

Be it known that I, VERNER J. WAHLSTROM, a citizen of the United States, residing at New York, in the county of Kings and State of New York, have invented a new and useful Chuck, of which the following is a specification.

This invention relates to an improvement in chucks.

Heretofore, chucks have been constructed in which a series of rollers were used, the rollers operating on inclined faces and contacting with the tool shank, so that as the resistance increased during the drilling operation the rollers were caused to roll up on the inclined faces and bite the tool shank with increased force. The angle of inclination of the face upon which the roller operates is necessarily limited, to prevent the roller from slipping back, and the range of the chuck, that is, the number of different sized drills which it can accommodate, is limited, and this is objectionable.

It is one of the objects of this invention to provide a chuck in which a wider range is obtained.

Another object is to provide a chuck having jaws moved radially toward and away from the axis of the chuck, the biting action being effected by rollers operating on inclined faces on the jaws so that only a very limited movement of the roller is necessary to hold the drill shank after it has been brought into contact with the same.

With this and other objects in view, the invention consists in certain constructions and combinations which will be hereinafter fully described and then specifically pointed out in the claims hereunto appended.

Figure 1:
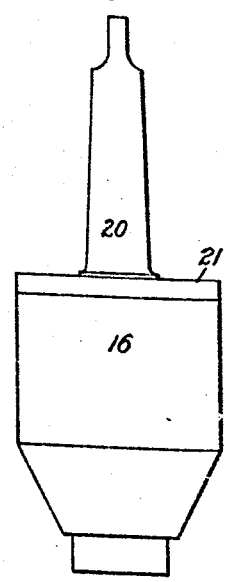
Figure 2:
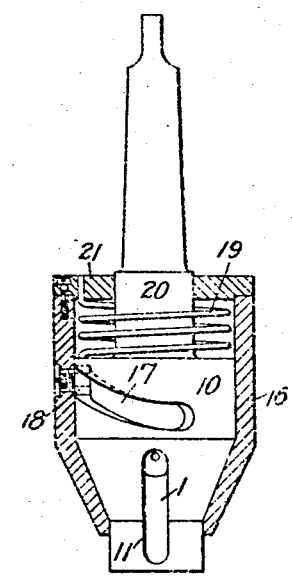
Figure 3:
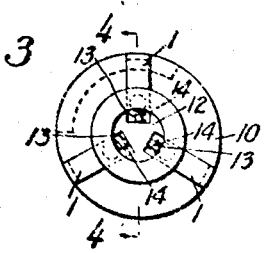
Figure 4:
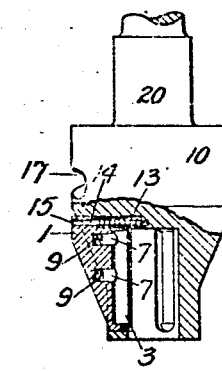
Figure 5:
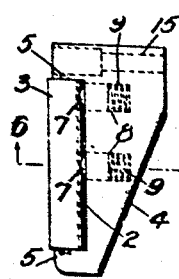
Figure 6:
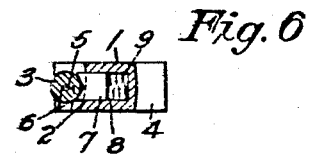

In the drawings which form a part of this specification and in which like characters of reference indicate the same parts, Figure 1 is an elevation of a structure embodying the invention, Fig. 2 is an elevation, partly in section, of the structure shown in Fig. 1, Fig. 3 is an end view of the body portion of the chuck, Fig. 4 is an elevation of the body portion of the chuck, partly in section on the line 4—4 of Fig. 3, Fig. 5 is an enlarged detail view of one of the jaws, and Fig. 6 is a section on the line 6—6 of Fig. 5.

In carrying the invention into effect, a radially movable jaw having an inclined face is employed and this jaw carries a roller which is arranged to be rolled up the inclined face of the jaw by resistance of the tool shank to the turning movement of the chuck. The jaw may vary in form within wide limits; but in the best constructions and as shown, a jaw 1 is employed having an inclined face 2 and carrying a roller 3 on its operating edge. In the device illustrated, the jaw is provided with a tapered face 4, the purpose of which will be hereinafter explained. While the roller 3 might be otherwise held in position; as shown, it is provided at either end with a stud 5 which is loosely fitted in a slot 6 cut transversely in the jaw, the slot 6 being wide enough to permit the roller being thrown in and out of contact with the inclined face 2. Means are provided for normally keeping the roller out of contact with the inclined face and this means may vary widely; as shown, spring actuated means are employed for this purpose and consist of a pair of plungers 7 mounted to slide in recesses 8 cut in the jaw, the plungers 7 being held against the roller by means of springs 9. The operation of this part of the structure is as follows: The jaw is moved toward the axis of the chuck by any suitable means and after the roller 3 comes in contact with the shank of the tool a further movement of the jaw results in the springs 9 being compressed and the roller 3 forced against the inclined face 2. The resistance of the tool shank to the rotating movement of the chuck then causes the roller to ride up the inclined face 2 and bite the tool shank harder as the resistance increases. Owing to the fact that the roller is seated against the inclined face before it comes into operation, a very slight rolling movement is all that is necessary to bite the tool shank hard. When the tool is to be released, the jaw is moved in the opposite direction and the plunger 7 returns the roller to its normal position which is that shown in Figs. 5 and 6.

In the best constructions and as shown, a plurality of radially movable jaws each having an inclined face and each carrying a roller operating on said faces, is employed, and when, as in the present invention, three of such jaws are used, they are spaced 120 degrees apart, as is clearly shown in Fig. 3.

When a plurality of jaws are used they are mounted in a chuck-body 10, partly cylindrical and partly conical in form, radial slots 11 being cut through the walls of the conical portion of the body and into a central aperture 12 within which the tool shank is inserted. The tapered face of the jaws, hereinbefore described, is of the same angle as that of the conical portion of the chuck-body 10, and during their movement in the slots 11 these faces are maintained in parallelism.

Spring actuated means are employed to move the jaws outwardly or away from the axis of the aperture, and while these means may vary; as shown, a spring 13 is employed for this purpose. This spring is wound in an open coil around a post 14 fast in the chuck-body and working in a hole 15 in the jaw, the post serving to guide both the jaw and the spring.

Means are provided for positively moving the jaws toward the axis of the chuck for the purpose of bringing the roller 3 into contact with the tool shank and these means may vary within wide limits; as shown, a sleeve 16 is employed which is partly cylindrical and partly conical in form, the cylindrical portion of the sleeve fitting loosely over the cylindrical portion of the chuck-body 10 and the conical portion of the sleeve fitting loosely over the conical portion of the chuck-body surrounding the same and contacting with the tapered faces of the jaws 1. It will be readily understood that if the sleeve 16 is moved downwardly the conical portion of the same will leave the conical portion of the chuck-body and the jaws permitted to be moved outward by the springs 13, and that when the sleeve is moved in an upward direction the jaws will be positively moved toward the axis of the chuck. While the sleeve might be moved vertically to effect the movement of the jaws; as shown, a spiral movement is given to the sleeve the object of the spiral movement being to effect the downward movement through a relative rotary movement between the sleeve and the chuck-body so that the jaws may move while the chuck is running by simply grasping the sleeve and holding it against rotation for an instant, long enough to release the tool. To effect this spiral movement the cylindrical portion of the chuck-body 10 is provided with a spiral slot 17 in which works a stud 18 carried by the sleeve 16. The slot 17 is so formed that when the sleeve 16 is stopped by the operator the sleeve will be given a spirally downward movement, relieving the pressure of the jaws and permitting them to move outward to release the tool.

It is also desirable to insert a tool shank in the aperture 12 and to cause it to be caught, while the chuck is running.

The means for positively moving the jaws toward the axis of the chuck to catch and hold the tool shank is effected, in the device illustrated, by an upward spiral movement of the sleeve 16 and this movement may be produced by any suitable means. As shown, this movement is effected by means of a spring 19 coiled around the shank 20 of the chuck-body and having one end fast in the chuck-body and the other end fast in a plate 21 surrounding the shank 20 and fast to the sleeve 16, as is clearly shown in Fig. 2.

Changes and variations may be made in the structure by which the invention is carried into effect. The invention, therefore, is not to be limited to the precise details of the structure shown and described.

What is claimed is:

1. In a chuck, the combination with a radially movable jaw having an inclined face, of a roller carried by said jaw and arranged to be rolled up said inclined face by contact with a tool shank, substantially as described.

2. In a chuck, the combination with a radially movable jaw having an inclined face, of a roller carried by said jaw and arranged to be rolled up said inclined face by contact with a tool shank, and means for normally keeping the roller out of contact with the inclined face, substantially as described.

3. In a chuck, the combination with a radially movable jaw having an inclined face, of a roller carried by said jaw and arranged to be rolled up said inclined face by contact with a tool shank, and spring actuated means for normally holding the roller out of contact with the inclined face, substantially as described.

4. In a chuck, the combination with a radially movable jaw having an inclined face, of a roller having at each end a stud loosely fitted in a transverse slot in the jaw, the width of the slot being sufficient to permit of the roller being thrown in and out of contact with the inclined face, and spring plungers located in the jaw for normally holding the roller out of contact with the inclined face, substantially as described.

5. In a chuck, the combination with a chuck-body having a central aperture and radial slots cut through the walls of the body into the aperture, of a plurality of jaws mounted in said slots each jaw having an inclined face, a plurality of rollers one of which is carried by each jaw and arranged to be rolled up said inclined face by contact with a tool shank, means for positively moving the jaws toward the axis of the chuck, and spring actuated means for moving the jaws outward, substantially as described.

6. In a chuck, the combination with a chuck-body having a central aperture and radial slots cut through the walls of the body into the aperture, of a plurality of jaws mounted in said slots each jaw having an inclined face, a plurality of rollers one of which is carried by each jaw and arranged to be rolled up said inclined face by contact with a tool shank, spring actuated means for positively moving the jaws toward the axis of the chuck, and spring actuated means for moving the jaws outward, substantially as described.

7. In a chuck, the combination with a chuck-body partly cylindrical and partly conical in shape having a central aperture therein and a plurality of radial slots cut through the conical walls, of a plurality of tapered jaws mounted in said slots each jaw having an inclined face, a plurality of rollers one of which is carried by each jaw and arranged to be rolled up said inclined face by contact with a tool shank, springs for moving the jaws outwardly, a sleeve surrounding the conical portion of the body and contacting with the tapered edges of the jaws, and means for producing a longitudinal movement of the sleeve to positively move the jaws toward the axis of the aperture, substantially as described.

8. In a chuck, the combination with a chuck-body partly cylindrical and partly conical in shape having a central aperture therein and a plurality of radial slots cut through the conical walls, of a plurality of tapered jaws mounted in said slots each jaw having an inclined face, a plurality of rollers one of which is carried by each jaw and arranged to be rolled up said inclined face by contact with a tool shank, springs for moving the jaws outwardly, a sleeve surrounding the cylindrical and conical parts of the body the conical part of the sleeve contacting with the tapered edges of the jaws, and means for moving the sleeve spirally about the chuck-body to positively move the jaws toward the axis of the aperture, substantially as described.

9. In a chuck, the combination with a chuck-body partly cylindrical and partly conical in shape having a central aperture therein and a plurality of radial slots cut through the conical walls, of a plurality of tapered jaws mounted in said slots each jaw having an inclined face, a plurality of rollers one of which is carried by each jaw and arranged to be rolled up said inclined face by contact with a tool shank, springs for moving the jaws outwardly, a sleeve surrounding the cylindrical and conical portion of the body the conical portion of the sleeve contacting with the tapered edges of the jaws, a spiral slot in the cylindrical portion of the body, a stud fitted in the sleeve and working in said slot, and a spring for rotating the sleeve whereby the sleeve is given a spiral movement to positively move the jaws toward the axis of the aperture, substantially as described.

In testimony whereof, I have signed my name to this specification in the presence of two subscribing witnesses.

VERNER J. WAHLSTROM.

Witnesses:
SYDNEY I. PRESCOTT,
LENA L. BROWN.